June 24, 1930.  W. B. REDFIELD  1,766,189
SPRING SEAT ATTACHMENT
Filed Nov. 21, 1927
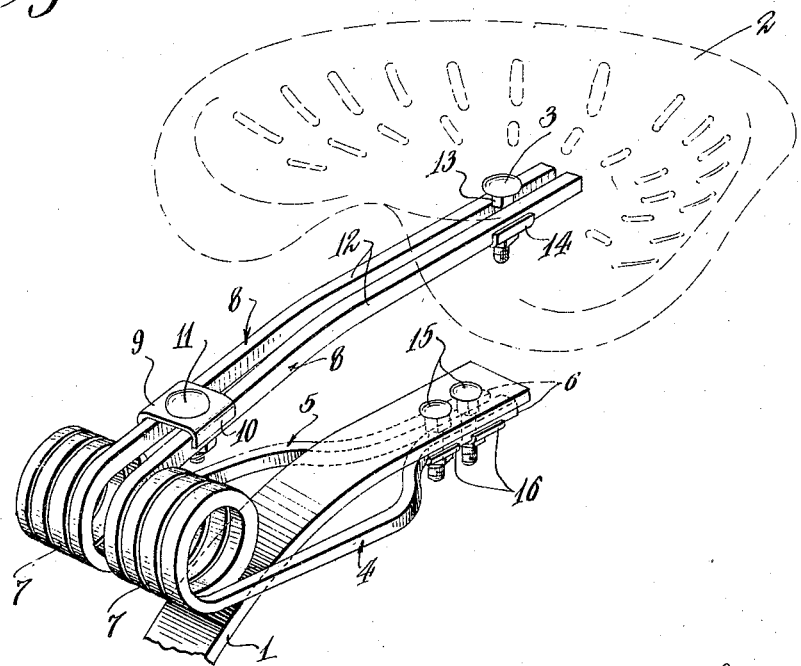
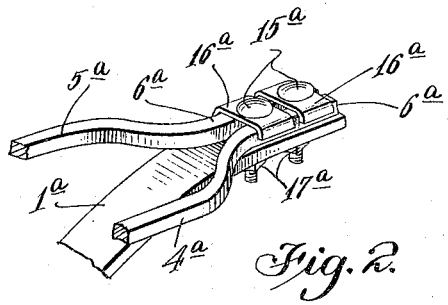
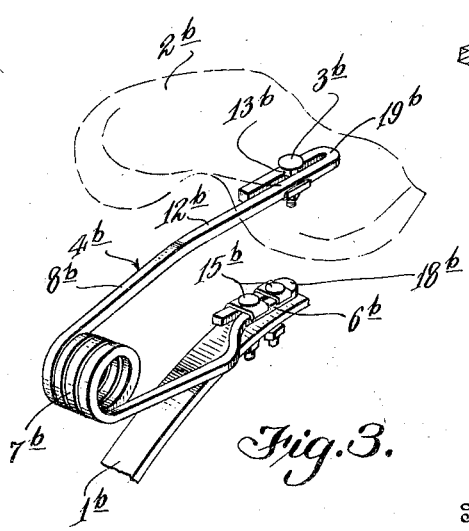
Inventor
Willis B. Redfield
By Lyon & Lyon
Attorneys Patented June 24, 1930

1,766,189

UNITED STATES PATENT OFFICE

WILLIS B. REDFIELD, OF DOWNEY, CALIFORNIA

SPRING SEAT ATTACHMENT

Application filed November 21, 1927. Serial No. 234,704.

This invention relates to spring seat attachments, and is more particularly directed to a spring means adapted to be attached between the pole of a tractor and the seat mounted thereon.

An object of this invention is to provide an attachment for attaching seats to the poles of tractor seats which is adapted to be attached to the pole of any tractor and to the seat customarily carried thereby and which provides means for taking up the shocks in any direction.

Another object of this invention is to provide an attachment for securing seats to the pole of a tractor which is of inexpensive construction, including no wearing parts and which provides adjustment means permitting the seat to be correctly adjusted in position relative to said attachment and to the pole of the tractor in accordance with the weight of the individual to be carried on said seat.

Other objects and advantages of this invention, it is believed, will be apparent from the following detailed description of a preferred embodiment thereof as illustrated in the accompanying drawings.

In the drawings:

Figure 1 is a perspective view of a spring seat attachment embodying this invention.

Figure 2 is a fragmental perspective view illustrating the spring seat attachment as connected to the pole of the tractor in a modified way.

Figure 3 is a perspective view of a modified form of spring seat attachment embodying this invention.

In the preferred embodiment of this invention illustrated in the accompanying drawings, 1 illustrates the pole of a tractor or similar device upon which a seat 2 is customarily secured. The pole 1 is, in accordance with modern constructions, formed of a flat portion of spring steel and the seat 2 is carried on the pole 1 by means of a bolt 3 which is passed through a hole formed in the end of the pole 1. The bolt 3 is ordinarily of the carriage type having a squared portion which fits within a squared-out hole formed in the end of the pole 1 and seat 2 in order to prevent relative rotation of the seat 2 and pole 1.

The attachment embodying this invention includes a pair of continuous flat spring-steel bars 4 and 5 which are bent together at their ends 6 and are bent spirally, as illustrated at 7, to form springs. The ends 8 of said bars 4 and 5 extend from the springs 7 in parallel relation and are secured together adjacent the springs 7 by means of a clip 9 which has downwardly extending portions 10 which fit over the edges of the bars 4 and 5 and is secured in position by means of a carriage bolt 11. The parallel portions 8 of the bars 4 and 5 extend rearwardly from the springs 7 in substantially parallel relation to the curved pole 1 and are bent at an intermediate portion 12 to maintain this substantially parallel relation with the pole 1. The seat 2 is secured to the parallel portions 8 of the bars 4 and 5 by means of the carriage bolt 3 which is passed through the squared-out hole of the tractor seat 2 and has its squared portion 13 extending between the parallel ends of the bars 4 and 5, thereby holding the tractor seat from rotation relative to the bars 4 and 5. A clip 14 also acts to hold the parallel portions 8 of the bars 4 and 5 together at their outer ends. The tractor seat 2 may be adjusted to any desired or preferred position of the portions 8 of the bars 4 and 5, depending upon the weight of the individual to be carried thereby by merely loosening the carriage bolt 3 and sliding the seat 2, clip 14, and bolt 3 to the desired position and clamping the seat 2 in the desired position by means of the bolt 3. The ends 6 of the bars 4 and 5 are secured to the end of the pole 1 by means of a pair of carriage bolts 15 which are passed through squared-out holes formed in the pole 1. The ends of these bars 4 and 5 are held together and locked to the squared portions of the bolts 15 by means of clips 16 similar to the clips 9 and 14.

When the pole 1 is formed with squared holes to accommodate the carriage bolts 15, it is preferable that the ends 6ª be secured to the under side thereof in which case the pole 1 will extend through the bars 4 and 5, as illustrated in Figure 1. In case the pole does not have squared out holes, it is preferable that the same be secured to the upper face thereof, as illustrated in Figure 2, in which case the bars $4^a$ and $5^a$ will be secured to the pole $1^a$ by means of carriage bolts $15^a$ which pass through the clips $16^a$. The squared portions of the carriage bolts $15^a$ in this case extend between the ends $6^a$ of the bars $4^a$ and $5^a$ and the bolts are secured in position by means of nuts $17^a$ screw-threaded to the carriage bolts $15^a$ at the under side of the pole $1^a$.

In the modified form of this invention illustrated in Figure 3, the attachment is formed of a single bar $4^b$ bent downwardly at its end $6^b$ and looped as illustrated at $18^b$ to form a socket into which the squared ends of the carriage bolts $15^b$ are adapted to fit. The bar $4^b$ is spirally wound to form the spring $7^b$ and the end $8^b$ of the bar $4^b$ extends rearwardly from the spring $7^b$ and is bent at $12^b$ in a manner similar to the bars 4 and 5. The bar $4^b$ is looped at its rearward end, as illustrated at $19^b$, in order to form a squared socket into which the squared portion $13^b$ of the carriage bolt $3^b$ fits when securing the seat in position to prevent relative rotation of the seat and the bar $4^b$.

Having fully described my invention, it is to be understood that the same is susceptible to many modifications, and my invention is of the full scope of the appended claims.

I claim:

An attachment for spring seats including a pair of flat spring steel bars bent inwardly at one end, the bars being spirally wound to provide coil springs having their axes in alignment and having their opposite ends terminating from adjacent ends of said coils and extending rearwardly from the said coils, a seat, a clip adapted to hold said bars together at the last named ends, a bolt passing through the seat and through said clip for holding the seat to said bars and the clip clamped to said bars, a spring seat pole, a clip for securing the first named ends of said bars together, and a bolt passed through said clip and said pole for holding the clip engaged with said bars, and the bars secured to said pole.

Signed at Los Angeles, California, this 10th day of Nov., 1927.

WILLIS B. REDFIELD.